US011319963B2

(12) United States Patent
Epstein

(10) Patent No.: US 11,319,963 B2
(45) Date of Patent: May 3, 2022

(54) COMPRESSOR SURGE CONTROL

(71) Applicant: United Technologies Corporation, Farmington, CT (US)

(72) Inventor: Alan H. Epstein, Lexington, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 690 days.

(21) Appl. No.: 15/992,747

(22) Filed: May 30, 2018

(65) Prior Publication Data
US 2019/0368500 A1 Dec. 5, 2019

(51) Int. Cl.
 *F04D 27/02* (2006.01)
 *F02C 9/50* (2006.01)
 (Continued)

(52) U.S. Cl.
 CPC ............ *F04D 27/0261* (2013.01); *F02C 9/50* (2013.01); *F04D 25/04* (2013.01); *F04D 25/06* (2013.01); *H02P 23/04* (2013.01); *F05D 2220/32* (2013.01); *F05D 2220/76* (2013.01); *F05D 2260/4031* (2013.01); *F05D 2270/101* (2013.01)

(58) Field of Classification Search
 CPC .... F02C 9/50; F02C 9/56; F04D 27/02; F04D 27/0261; F04D 25/04; F04D 25/06; F05D 2270/10; F05D 2270/101; F05D 2270/102; H02P 23/04
 See application file for complete search history.

(56) References Cited

U.S. PATENT DOCUMENTS 4,177,649 A 12/1979 Venema
5,005,353 A * 4/1991 Acton ............... F01D 17/02
 60/39.281
(Continued)

FOREIGN PATENT DOCUMENTS

EP 1712761 A2 10/2006
EP 2657457 A2 10/2013
EP 3246528 A1 11/2017

OTHER PUBLICATIONS

J.T. Gravdahl, et al., "Drive torque actuation in active surge control of centrifugal compressors," Automatica 38 (2002) pp. 1881-1893.
(Continued)

*Primary Examiner* — Jason H Duger
(74) *Attorney, Agent, or Firm* — Cantor Colburn LLP

(57) ABSTRACT

A compressor surge control system includes a rotor system with at least one compressor section and at least one turbine section operably coupled to a shaft. The compressor surge control system also includes one or more rotor system sensors configured to collect a plurality of sensor data from the rotor system, an electric motor operably coupled to the rotor system, and a controller. The controller is operable to monitor the one or more rotor system sensors while the rotor system is rotating. The controller determines whether the plurality of sensor data from the one or more rotor system sensors is indicative of an early-stage compressor surge oscillation. A surge control torque is determined to diminish the early-stage compressor surge oscillation of the rotor system. The electric motor is commanded to apply the surge control torque to the rotor system.

12 Claims, 5 Drawing Sheets

(51) Int. Cl.
  *F04D 25/04*  (2006.01)
  *F04D 25/06*  (2006.01)
  *H02P 23/04*  (2006.01)

(56) References Cited

U.S. PATENT DOCUMENTS

| | | |
|---|---|---|
| 6,871,487 B2 | 3/2005 | Kurtz et al. |
| 6,871,498 B1 | 3/2005 | Allen et al. |
| 7,159,401 B1 | 1/2007 | Kurtz et al. |
| 9,260,195 B2 | 2/2016 | Oyori et al. |
| 2002/0158517 A1 | 10/2002 | Rouse et al. |
| 2006/0042252 A1 | 3/2006 | Derouineau |
| 2013/0276425 A1* | 10/2013 | Rittenhouse .......... F04D 27/001 |
| | | 60/39.091 |
| 2016/0356277 A1 | 12/2016 | Cortinovis et al. |
| 2017/0190441 A1* | 7/2017 | Mackin ................... F02C 7/36 |
| 2017/0335713 A1* | 11/2017 | Klemen .............. H02K 7/1823 |
| 2017/0335795 A1* | 11/2017 | Klemen ................. F01D 17/02 |
| 2017/0349164 A1 | 12/2017 | Miller et al. |

OTHER PUBLICATIONS

K.O. Boinov, et al., "Surge Control of the Electrically Driven Centrifugal Compressor," IEEE Transactions on Industry Applications, vol. 42, No. 6, Nov./Dec. 2006, 9 pages.
Paduano, J.D., et al., "Compression System Stability and Active Control", Annu. Rev. Fluid Mech. 2001, 33:491-517 (27 pp.).
EP Application No. 19176315.0 Extended EP Search Report dated Sep. 9, 2019, 10 pages.

\* cited by examiner

COMPRESSOR SURGE CONTROL

BACKGROUND

The subject matter disclosed herein generally relates to rotating machinery and, more particularly, to a method and an apparatus for compressor surge control.

Surge and rotating stalls (herein referred to simply as surge) are oscillatory fluid mechanic instabilities of a compression system and thus endemic to all compressors. Surge should be avoided since it reduces the thrust of an engine, induces high temperatures, large mechanical stresses and deflections, can shut the engine down, and in some cases result in a catastrophic failure. Compressors are typically designed and installed with a goal of avoiding the so-called "surge line", which marks the operational boundary for instability inception. Control laws for a gas turbine engines are typically designed to avoid actions that could induce surge, such as overly rapid transients. In addition, variable geometry, such as variable angle stators and surge control valves, may be used to modify gas path flow to reduce the likelihood of surge. Over the last several decades, so called-active surge control approaches have been proposed and demonstrated in test apparatus, and in some cases in engines. These are distinguished from the older approaches in service in that they use real time data from sensors in the engine to command one or more high speed actuators. Actuation techniques proposed or demonstrated include fuel flow modulation, variable vanes, jets into the compressor, and bleed from the compressor.

BRIEF DESCRIPTION

According to one embodiment, a compressor surge control system includes a rotor system with at least one compressor section and at least one turbine section operably coupled to a shaft. The compressor surge control system also includes one or more rotor system sensors configured to collect a plurality of sensor data from the rotor system, an electric motor operably coupled to the rotor system, and a controller. The controller is operable to monitor the one or more rotor system sensors while the rotor system is rotating. The controller determines whether the plurality of sensor data from the one or more rotor system sensors is indicative of an early-stage compressor surge oscillation. A surge control torque is determined to diminish the early-stage compressor surge oscillation of the rotor system. The electric motor is commanded to apply the surge control torque to the rotor system.

In addition to one or more of the features described above or below, or as an alternative, further embodiments may include where the surge control torque includes a phase, a magnitude, and a sign of one or more torques to diminish the early-stage compressor surge oscillation.

In addition to one or more of the features described above or below, or as an alternative, further embodiments may include where the rotor system includes a spool of a gas turbine engine.

In addition to one or more of the features described above or below, or as an alternative, further embodiments may include where the electric motor is operable to apply one or more torque perturbations to a steady state load of the rotor system to modify the early-stage compressor surge oscillation of the rotor system.

In addition to one or more of the features described above or below, or as an alternative, further embodiments may include where the electric motor is a motor-generator operable in a generator mode to increase a load on the rotor system and in a motoring mode to decrease the load of the rotor system.

In addition to one or more of the features described above or below, or as an alternative, further embodiments may include where the electric motor is directly coupled to the shaft.

In addition to one or more of the features described above or below, or as an alternative, further embodiments may include where the electric motor is coupled to the shaft through a geared interface.

According to another embodiment, a gas turbine engine includes a compressor section, a turbine section, a combustor section between the compressor section and the turbine section, and a shaft operably coupling the compressor section and the turbine section. The compressor section, the turbine section, and the shaft form a rotor system. The gas turbine engine also includes one or more rotor system sensors configured to collect a plurality of sensor data from the rotor system, and an electric motor operably coupled to the rotor system. The gas turbine engine further includes means for determining an early-stage compressor surge oscillation and means for diminishing the early-stage compressor surge oscillation.

In addition to one or more of the features described above or below, or as an alternative, further embodiments may include where the means for determining the early-stage compressor surge oscillation includes means for monitoring the one or more rotor system sensors while the rotor system is rotating, and means for determining whether the plurality of sensor data from the one or more rotor system sensors is indicative of the early-stage compressor surge oscillation.

In addition to one or more of the features described above or below, or as an alternative, further embodiments may include where the means for diminishing the early-stage compressor surge oscillation includes means for determining a surge control torque to diminish the early-stage compressor surge oscillation, and means for commanding the electric motor to apply the surge control torque to the rotor system.

In addition to one or more of the features described above or below, or as an alternative, further embodiments may include where the surge control torque to diminish the early-stage compressor surge oscillation is determined and applied in combination with at least one supplemental surge control including one or more of: a fuel flow modulation control, a variable angle of attack vane control, a bleed valve control, and an air jet control.

In addition to one or more of the features described above or below, or as an alternative, further embodiments may include where the motor-generator is operable as a starter motor and as a generator to produce electric power.

In addition to one or more of the features described above or below, or as an alternative, further embodiments may include where the rotor system is a low speed spool, and further include a high speed spool with a high pressure compressor, a high pressure turbine, and a second shaft concentrically arranged with respect to the shaft of the low speed spool.

In addition to one or more of the features described above or below, or as an alternative, further embodiments may include where a second electric motor is operably coupled to the second shaft, the electric motor and the second electric motor are independently controlled to each supply a supplemental motive force, and fuel combustion in the combustor section provides a primary motive force for the low speed spool and the high speed spool.

According to another embodiment, a method of compressor surge control is provided. One or more rotor system sensors of a rotor system are monitored while the rotor system is rotating, where the rotor system includes at least one compressor section and at least one turbine section operably coupled to a shaft. The method further includes determining whether a plurality of sensor data from the one or more rotor system sensors is indicative of an early-stage compressor surge oscillation. A surge control torque is determined to diminish the early-stage compressor surge oscillation of the rotor system. An electric motor operably coupled to the rotor system is commanded to apply the surge control torque to the rotor system.

In addition to one or more of the features described above or below, or as an alternative, further embodiments may include operating the electric motor in a generator mode to increase a load on the rotor system, and operating the electric motor in a motoring mode to decrease the load of the rotor system.

A technical effect of the apparatus, systems and methods is achieved by using dynamic torque and power capability of an electric motor operably coupled to a shaft of a rotating machine to damp out early-stage compressor surge oscillations as described herein. It is recognized that the approach described herein, of using dynamic torque capability of an electric motor to damp surge, may be combined with other surge suppression or avoidance approaches—such as fuel flow modulation, variable angle of attack vanes, bleed valves, and air jets—to enhance effectiveness.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
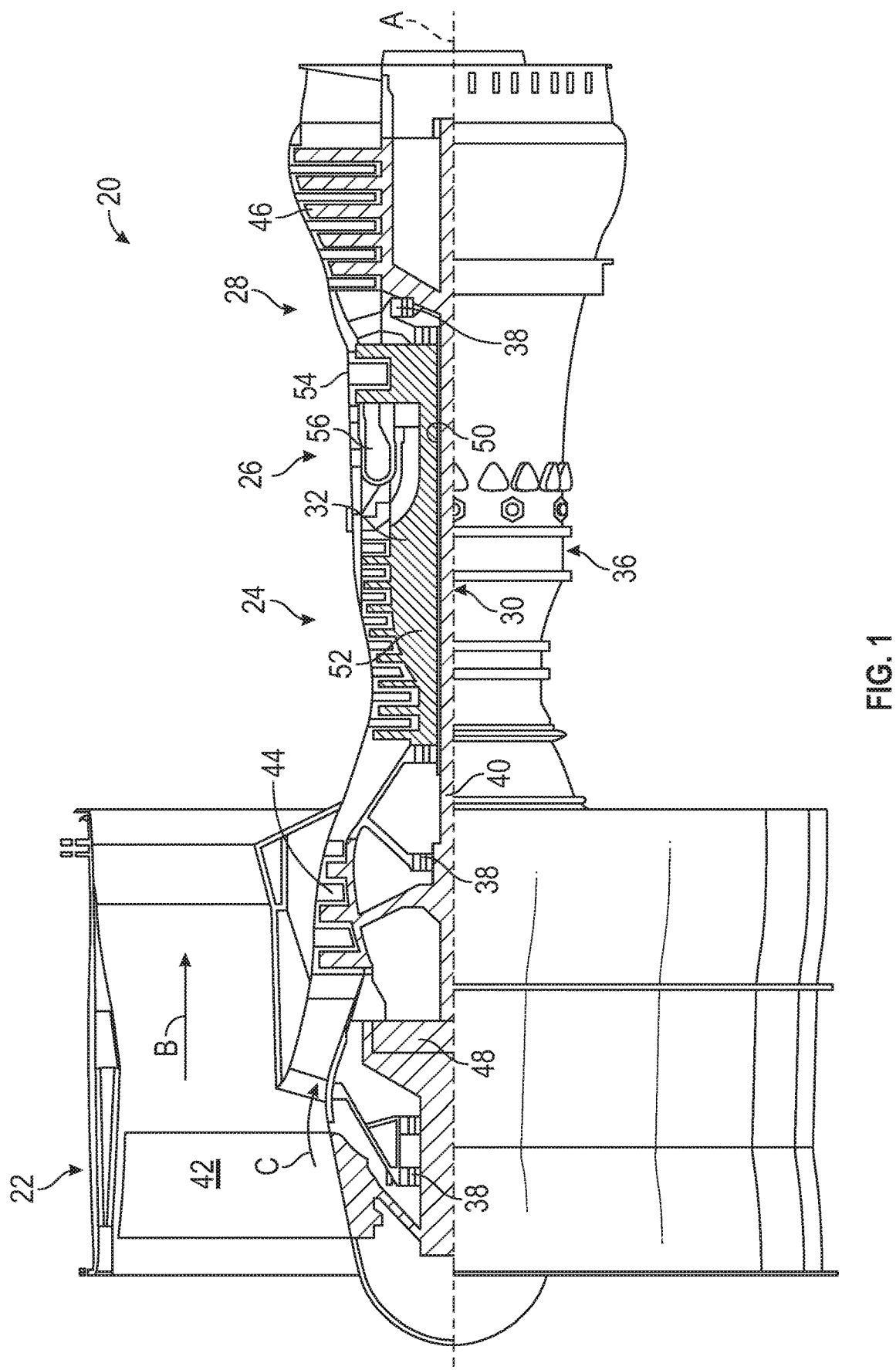
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
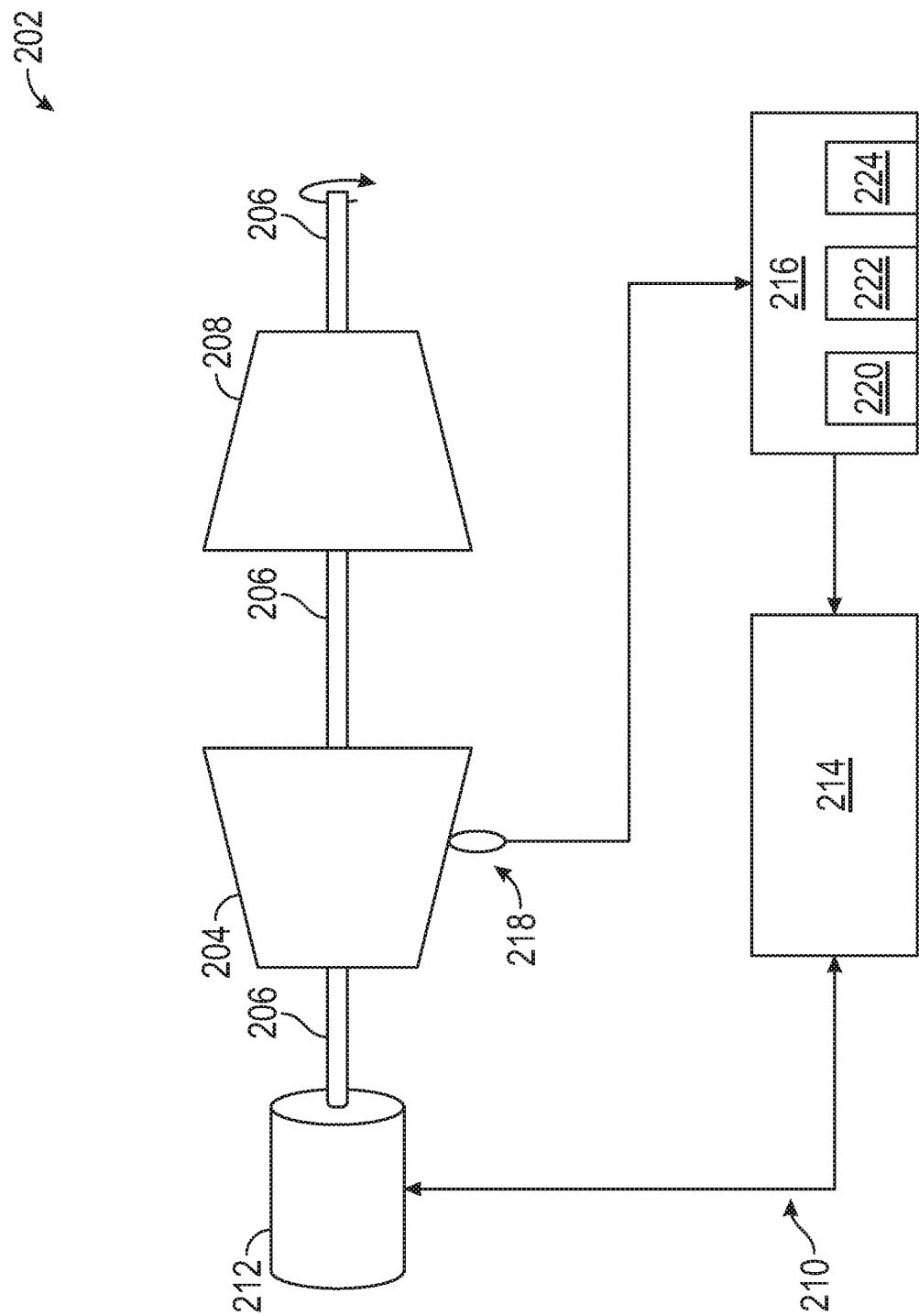
FIG. 2 is a schematic diagram of a rotor system with a compressor surge control system, in accordance with an embodiment of the disclosure.

Referring now to the drawings, FIG. 2 illustrates a rotor system 202 that includes at least one compressor section 204 and at least one turbine section 208 operably coupled to a shaft 206. The rotor system 202 can be a spool of the gas turbine engine 20 of FIG. 1, such as the low speed spool 30 or the high speed spool 32. For example, when embodied as the low speed spool 30, the at least one compressor section 204 can be equivalent to the low pressure compressor 44 and may include the fan 42, the shaft 206 can be equivalent to the inner shaft 40, and the at least one turbine section 208 can be equivalent to the low pressure turbine 46 of FIG. 1. When embodied as the high speed spool 32, the at least one compressor section 204 can be equivalent to the high pressure compressor 52, the shaft 206 can be equivalent to the outer shaft 50, and the at least one turbine section 208 can be equivalent to the high pressure turbine 54 of FIG. 1.

In the example of FIG. 2, a compressor surge control system 210 is operably coupled to the rotor system 202. The compressor surge control system 210 includes an electric motor 212 directly coupled to the shaft 206. The compressor surge control system 210 also includes drive electronics 214 operable to control current to the electric motor 212 to adjust the speed and/or torque of the electric motor 212. The electric motor 212 can be a direct current (DC) motor or an alternating current (AC) motor including conventional motor components, such as a motor rotor and motor stator, including a plurality of motor windings and/or permanent magnets. The drive electronics 214 can also include conventional motor current control electronics, such as filters, switching components, rectifiers, inverters, and the like. In some embodiments, the electric motor 212 is a motor-generator operable in a generator mode to increase a load on the rotor system 202 and in a motoring mode to decrease the load of the rotor system 202. When implemented as a motor-generator, the drive electronics 214 may include power regulating circuitry and/or power converters to regulate electric power produced by the electric motor 212 in generator mode. For example, the electric motor 212 can act as a variable frequency generator in generator mode due to speed fluctuations of rotation of the shaft 206, which may be primarily driven by the at least one turbine section 208. In some embodiments, the electric motor 212 may be operable as a starter motor to partially or completely power rotation of the shaft 206 in a starting mode of operation (e.g., to start the gas turbine engine 20 of FIG. 1). Other uses and functions for the electric motor 212 are contemplated.

A controller 216 of the compressor surge control system 210 can monitor one or more rotor system sensors 218 while the rotor system 202 is rotating. The rotor system sensors 218 can be any type or combination of sensors operable to measure oscillations of the rotor system 202 and the airflow through it. For example, the rotor system sensors 218 can include one or more pressure sensors, speed sensors, torque sensors, and the like. The rotor system sensors 218 may be located proximate to the at least one compressor section 204, for example to measure pressure or velocity fluctuations within or in the vicinity of the at least one compressor section 204. The controller 216 can control a speed and torque of the electric motor 212 through the drive electronics 214. The controller 216 may also control other system aspects, such as controlling operation of the gas turbine engine 20 of FIG. 1. In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the drive electronics 214 and/or other systems (not depicted).

The controller 216 is operable to detect an early-stage compressor surge oscillation of the rotor system 202 based on the sensor data from the one or more rotor system sensors 218. For example, the controller 216 may monitor a rotational speed of the shaft 206 and pressure changes within the at least one compressor section 204 with respect to time. The controller 216 can also monitor one or more torques on the shaft 206, for example, through direct torque measurements from the one or more rotor system sensors 218 or derived torques based on system models and/or known relationships based on mass, acceleration, and/or geometric configuration of the rotor system 202. The controller 216 is an example of means for monitoring the one or more rotor system sensors 218 while the rotor system 202 is rotating and means for determining whether the plurality of sensor data from the one or more rotor system sensors 218 is indicative of the early-stage compressor surge oscillation. A potential full-scale surge event may begin as initial oscillating air flow pattern within the at least one compressor section 204 that can result in development of an oscillating torque on the shaft 206. An appropriate measurement of the spatial distribution of pressure or velocity fluctuations within the compression system is especially useful in detecting embryonic disturbances which can develop into surge. Threshold levels that define the early-stage compressor surge oscillation may be developed experimentally or analytically. For example, the early-stage compressor surge oscillation may be defined as 1%, 10%, 20%, 25%, or another predetermined threshold level with respect to a full surge event that may result in a flow reversal through the at least one compressor section 204. A model or mapping function (e.g., a multivariate table) may be used to establish combinations of parameters deemed sufficient under a set of operating conditions to determine whether an early-stage compressor surge oscillation is detected for a given set of operating conditions (e.g., pressure ratios, mass flow rates, inlet volume flows, speeds, etc.).

The controller 216 can determine a surge control torque to diminish the early-stage compressor surge oscillation of the rotor system 202 and command the electric motor 212 to apply the surge control torque to the rotor system 202. The controller 216 is an example of means for determining an early-stage compressor surge oscillation and means for diminishing the early-stage compressor surge oscillation. The controller 216 is also an example of means for determining a surge control torque to diminish the early-stage compressor surge oscillation and means for commanding the electric motor to apply the surge control torque to the rotor system. The surge control torque can include a phase, a magnitude, and a sign of one or more torques to diminish the early-stage compressor surge oscillation of the rotor system 202. For instance, the controller 216 can drive the electric motor 212 to apply one or more torque perturbations to a steady state load of the rotor system 202 to modify the early-stage compressor surge oscillation of the rotor system 202. Further, the controller 216 may operate the electric motor 212 in a generator mode to increase a load on the rotor system 202 and in a motoring mode to decrease the load of the rotor system 202. By damping out early-stage compressor surge oscillations through the electric motor 212, the early-stage compressor surge oscillations of the rotor system 202 can be controlled, thus preventing smaller oscillations from growing in larger surge/flow reversal events. With sufficient authority, the system can also be used to damp fully developed surge oscillations.

The general form of the mathematical representation of surge oscillatory behavior in compression systems such as gas turbines can be derived from the geometry of the respective system and is well understood. From these representations, robust control laws for a controller can be formatted using standard procedures. One such procedure is to excite the compressor 204, for example with air jets installed for this purpose or oscillation of variable stators with the machine. The excitation can take several forms, such as: sinusoidal frequency and amplitude sweeps, ramps, stochastic disturbances, and others as is well known. The data so generated can then be used to identify the relevant surge dynamics of the engine geometry, most conveniently as separate vibrational modes of the air often described in the form of eigenvectors and eigenvalues. Given this information, many standard mathematical techniques can be employed to formulate both linear and non-linear control laws. Note that this procedure need not be carried out on each engine unit, but may be more capable if done so depending on the geometrical uniformity of the manufacturing and assemble process.

Figure 3:
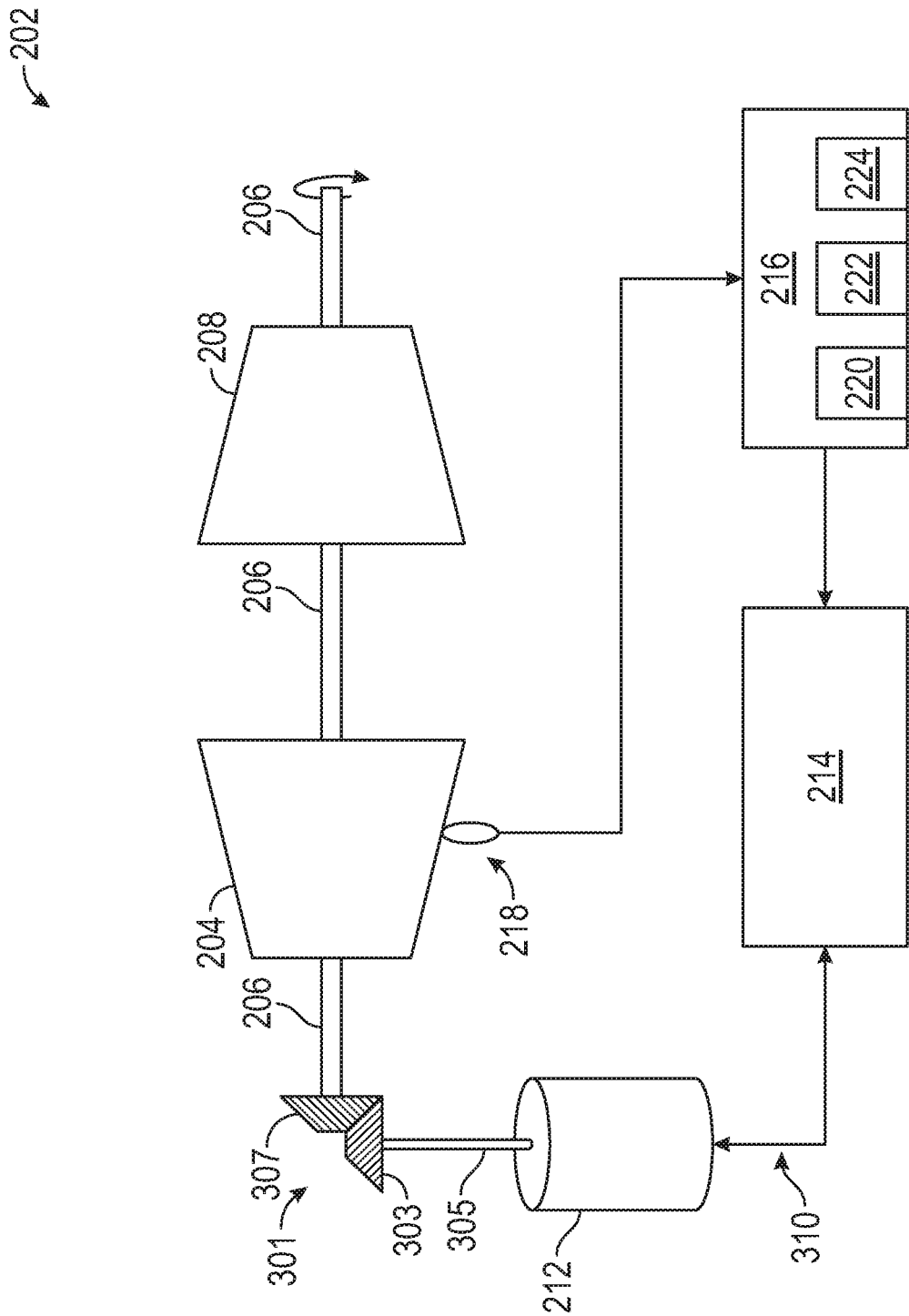
FIG. 3 is a schematic diagram of a rotor system with a compressor surge control system, in accordance with an embodiment of the disclosure.

Referring now to FIG. 3, a schematic diagram of the rotor system 202 with a compressor surge control system 310 is depicted as an alternate embodiment of the compressor surge control system 210 of FIG. 2. In the example of FIG. 3, similar to FIG. 2, the controller 216 is operable to measure aspects of the motion of the rotor system 202 through one or more rotor system sensors 218 and command the drive electronics 214 to modify a speed and/or torque of the electric motor 212 to apply a surge control torque to the rotor system 202. Rather than the electric motor 212 being directly coupled to the shaft 206, a compressor surge control system 310 of FIG. 3 includes a geared interface 301 that operably couples the electric motor 212 to the shaft 206. The geared interface 301 can include, for instance, a motor gear 303 coupled to a motor shaft 305 driven by the electric motor 212. The geared interface 301 can also include a rotor gear 307 coupled to the shaft 206. The motor gear 303 and the rotor gear 307 can each be beveled gears. The motor shaft 305 can be a tower shaft that enables the electric motor 212 to be separated at a greater distance from the rotor system 202 than in the compressor surge control system 210 of FIG. 2. Further separation of the electric motor 212 from the rotor system 202 can improve accessibility to the electric motor 212 for servicing and may reduce heating effects of the rotor system 202 on the electric motor 212 (e.g., due to fuel combustion). Surge control torque computations by the controller 216 can be adjusted to compensate for effects of the geared interface 301, such as gear backlash between the motor gear 303 and the rotor gear 307.

Figure 4:
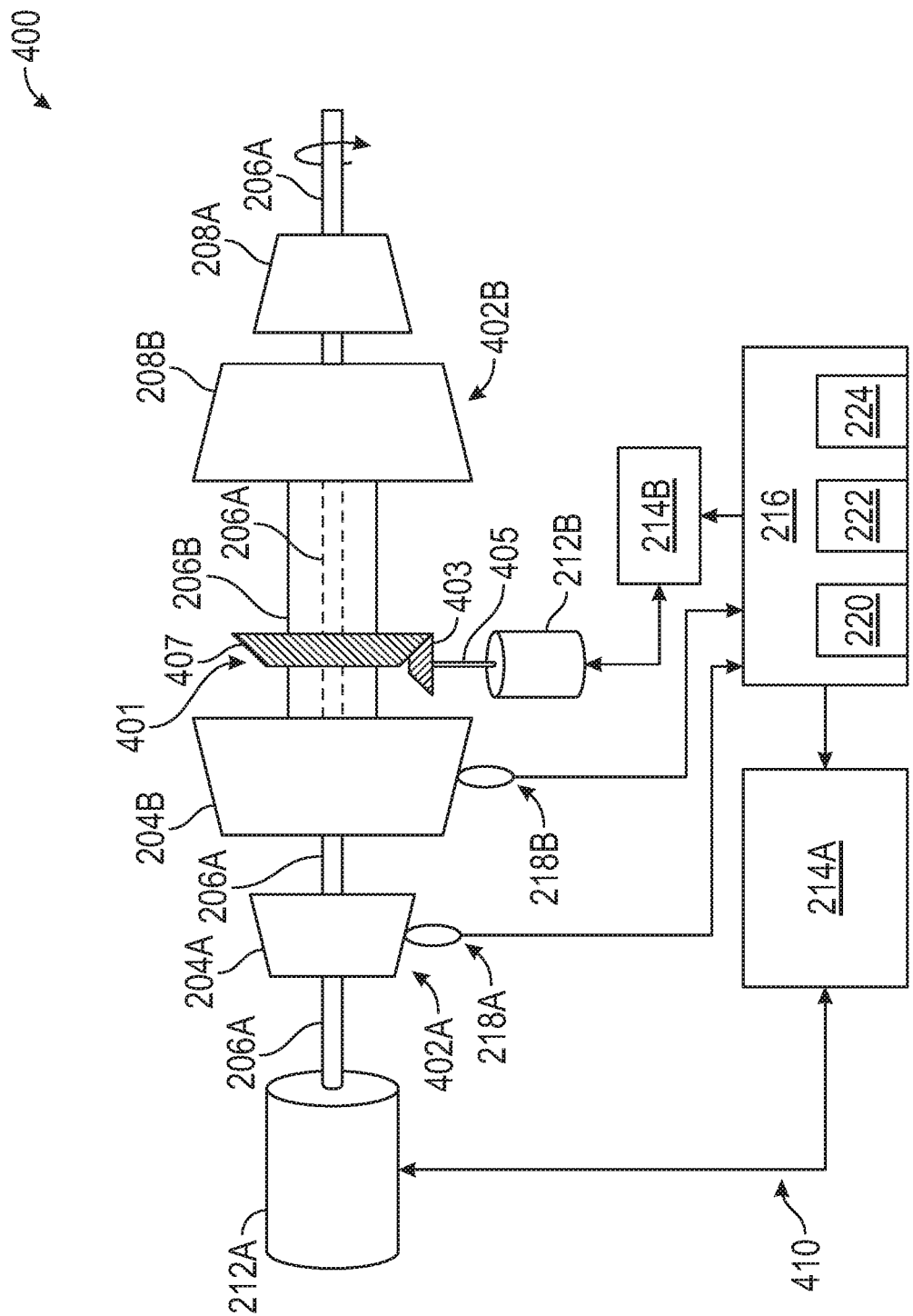
FIG. 4 is a schematic diagram of a dual rotor system with early-stage compressor surge oscillation damping, in accordance with an embodiment of the disclosure.

FIG. 4 is a schematic diagram of a dual rotor system 400 with early-stage compressor surge oscillation damping according to an embodiment. The dual rotor system 400 includes a first rotor system 402A and a second rotor system 402B, which may be an embodiment of the gas turbine engine 20 of FIG. 1. For instance, the first rotor system 402A can be the low speed spool 30 of the gas turbine engine 20, and the second rotor system 402B can be the high speed spool 32 of the gas turbine engine 20. The first rotor system 402A can include a first compressor section 204A and a first turbine section 208A operably coupled to a first shaft 206A. The second rotor system 402B can include a second compressor section 204B and a second turbine section 208B operably coupled to a second shaft 206B, where the second shaft 206B is concentrically arranged with respect to the first shaft 206A. With respect to the gas turbine engine 20 of FIG. 1, the first compressor section 204A can be equivalent to the low pressure compressor 44, the first shaft 206A can be equivalent to the inner shaft 40, and the first turbine section 208A can be equivalent to the low pressure turbine 46 of FIG. 1. Similarly, the second compressor section 204B can be equivalent to the high pressure compressor 52, the second shaft 206B can be equivalent to the outer shaft 50, and the second turbine section 208B can be equivalent to the high pressure turbine 54 of FIG. 1.

In the example of FIG. 4, a compressor surge control system 410 includes a first electric motor 212A driven by first drive electronics 214A and a second electric motor 212B driven by second drive electronics 214B. A first set of one or more rotor system sensors 218A may be associated with the first rotor system 402A, and a second set of one or more rotor system sensors 218B may be associated with the second rotor system 402B. A single instance of the controller 216 can be configured to independently control the first electric motor 212A responsive to sensor data from the first set of one or more rotor system sensors 218A, and separately control the second electric motor 212B responsive to sensor data from the second set of one or more rotor system sensors 218B. In other embodiments, the controller 216 is further subdivided as two or more separate controls, for instance, where a separate instance of the controller 216 is provided for each of the first rotor system 402A and the second rotor system 402B. The first electric motor 212A and the second electric motor 212B can be independently controlled to each supply a supplemental motive force to the respective shafts 206A, 206B, where fuel combustion in the combustor section 26 (FIG. 1) can provide a primary motive force for the first rotor system 402A as the low speed spool 30 and for the second rotor system 402B as the high speed spool 32.

In some embodiments, the first electric motor 212A is operably coupled to the first shaft 206A using a direct coupled, while the second electric motor 212B is operably coupled to the second shaft 206B using a geared interface 401. Similar to FIG. 3, the geared interface 401 can include, for instance, a motor gear 403 coupled to a motor shaft 405 driven by the second electric motor 212B and a rotor gear 407 coupled to the second shaft 206B. While the example of FIG. 4 depicts the compressor surge control system 410 with the first and second electric motor 212A, 212B in different configurations, it will be understood that both of the first and second electric motors 212A, 212B can be directly or indirectly coupled to corresponding first and second shafts 206A, 206B. Further, the first electric motor 212A may be indirectly coupled through a tower shaft to the first shaft 206A, while the second electric motor 212B is directly coupled to the second shaft 206B. Further, the coupling locations of the first and second electric motors 212A, 212B to the first and second shafts 206A, 206B can vary, and the coupling locations depicted in FIG. 4 are merely one example.

Figure 5:
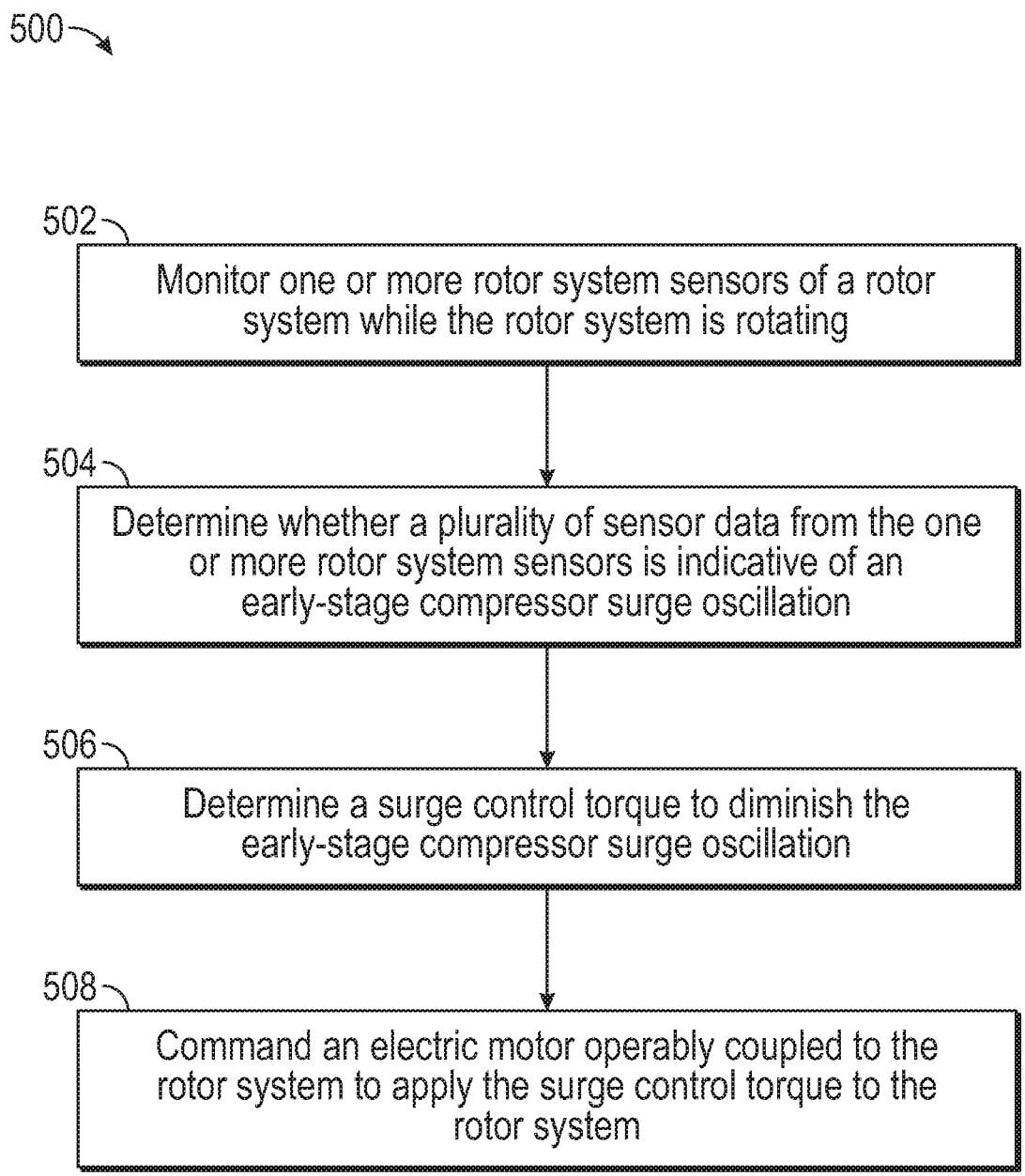
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for compressor surge control, in accordance with an embodiment. The method 500 may be performed, for example, by the compressor surge control systems 210, 310, 410 of FIGS. 2-4. For purposes of explanation, the method 500 is described primarily with respect to the compressor surge control system 210 of FIG. 2; however, it will be understood that the method 500 can be performed on other configurations, such as the compressor surge control systems 310, 410 of FIGS. 3 and 4, as well as other configurations (not depicted).

At block 502, a controller 216 monitors one or more rotor system sensors 218 of a rotor system 202 while the rotor system 202 is rotating. At block 504, the controller 216 determines whether a plurality of sensor data from the one or more rotor system sensors 218 is indicative of an early-stage compressor surge oscillation. At block 506, the controller 216 determines a surge control torque to diminish the early-stage compressor surge oscillation of the rotor system 202. The surge control torque can include a phase, a magnitude, and a sign of one or more torques to diminish the early-stage compressor surge oscillation of the rotor system 202. At block 508, the controller 216 commands an electric motor 212 operably coupled to the rotor system 202 to apply the surge control torque to the rotor system 202. The electric motor 212 can apply one or more torque perturbations to a steady state load of the rotor system 202 to modify the early-stage compressor surge oscillation of the rotor system 202, for instance, to damp out the early-stage compressor surge oscillation of the rotor system 202.

While the above description has described the flow process of FIG. 5 in a particular order, it should be appreciated that unless otherwise specifically required in the attached claims that the ordering of the steps may be varied. Also, it is clear to one of ordinary skill in the art that, the stability enhancement provided by the dynamic torque and power capability of the coupled electric motor system described herein can be combined with and enhance other surge control features, such as surge control valves, variable stators, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor surge control system comprising:
a rotor system comprising at least one compressor section and at least one turbine section operably coupled to a shaft;
one or more rotor system sensors configured to collect a plurality of sensor data from the rotor system;
an electric motor configurable as a motor-generator operably coupled to the rotor system; and
a controller configured to:
monitor the one or more rotor system sensors while the rotor system is rotating;
monitor one or more torques on the shaft;
determine whether the plurality of sensor data from the one or more rotor system sensors is indicative of an early-stage compressor surge oscillation of the rotor system;
determine a surge control torque to diminish the early-stage compressor surge oscillation; and
command the electric motor to apply the surge control torque to the rotor system by applying one or more torque perturbations to a steady state load of the rotor system to modify the one or more torques on the shaft and the early-stage compressor surge oscillation of the rotor system using the motor-generator in a generator mode to increase a load on the rotor system or in a motoring mode to decrease the load on the rotor system.

2. The compressor surge control system of claim 1, wherein the surge control torque comprises a phase, a magnitude, and a sign of one or more torques to diminish the early-stage compressor surge oscillation.

3. The compressor surge control system of claim 1, wherein the rotor system comprises a spool of a gas turbine engine.

4. The compressor surge control system of claim 1, wherein the electric motor is coupled to the shaft.

5. The compressor surge control system of claim 1, wherein the electric motor is coupled to the shaft through a geared interface.

6. The compressor surge control system of claim 3, wherein the surge control torque to diminish the early-stage compressor surge oscillation is determined and applied in combination with at least one supplemental surge control.

7. The compressor surge control system of claim 6, wherein the at least one supplemental surge control comprises one or more of: a fuel flow modulation control, a variable angle of attack vane control, a bleed valve control, and an air jet control.

8. The compressor surge control system of claim 3, wherein the spool is a low speed spool of the gas turbine engine.

9. The compressor surge control system of claim 8, further comprising:
   a high speed spool comprising a high pressure compressor, a high pressure turbine, and a second shaft concentrically arranged with respect to the shaft of the low speed spool; and
   a second electric motor operably coupled to the second shaft, wherein the electric motor and the second electric motor are independently controlled to each supply a supplemental motive force and fuel combustion in the combustor section provides a primary motive force for the low speed spool and the high speed spool.

10. The compressor surge control system of claim 1, wherein the motor-generator is operable as a starter motor and as a generator to produce electric power.

11. A method of compressor surge control by a controller, the method comprising:
   monitoring one or more rotor system sensors of a rotor system while the rotor system is rotating, wherein the rotor system comprises at least one compressor section and at least one turbine section operably coupled to a shaft;
   monitoring one or more torques on the shaft;
   determining whether a plurality of sensor data from the one or more rotor system sensors is indicative of an early-stage compressor surge oscillation of the rotor system;
   determining a surge control torque to diminish the early-stage compressor surge oscillation of the rotor system; and
   commanding an electric motor configurable as a motor-generator operably coupled to the rotor system to apply the surge control torque to the rotor system by applying one or more torque perturbations to a steady state load of the rotor system to modify the one or more torques on the shaft and the early-stage compressor surge oscillation of the rotor system using the motor-generator in a generator mode to increase a load on the rotor system or in a motoring mode to decrease the load on the rotor system.

12. The method of claim 11, wherein the surge control torque comprises a phase, a magnitude, and a sign of one or more torques to diminish the early-stage compressor surge oscillation of the rotor system.

\* \* \* \* \*